Oct. 22, 1968    SVEN-ERIK N. ERIKSSON    3,406,718
CONTROL VALVE ASSEMBLY FOR FLUID SYSTEMS
Filed April 5, 1965    2 Sheets-Sheet 1
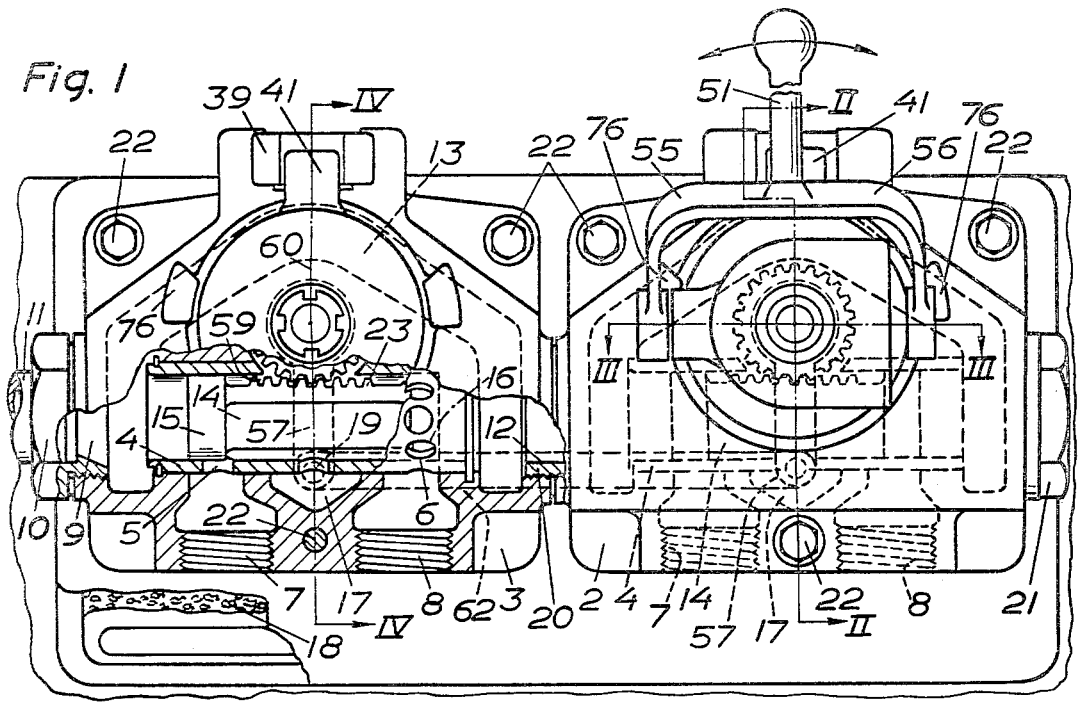
INVENTOR.
SVEN-ERIK NORE ERIKSSON
BY
ERIC Y. MUNSON,
Attorney Oct. 22, 1968  SVEN-ERIK N. ERIKSSON  3,406,718
CONTROL VALVE ASSEMBLY FOR FLUID SYSTEMS
Filed April 5, 1965  2 Sheets-Sheet 2
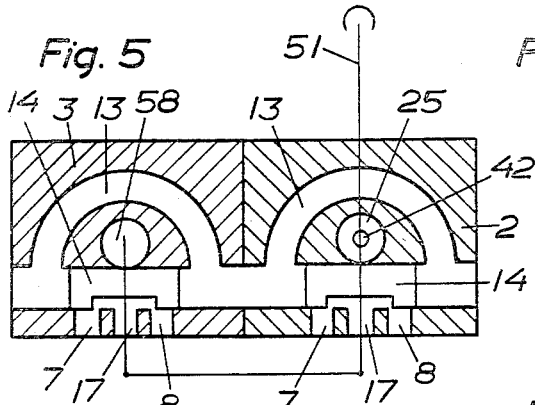
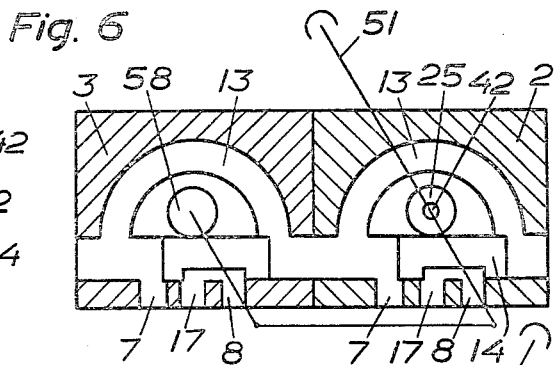
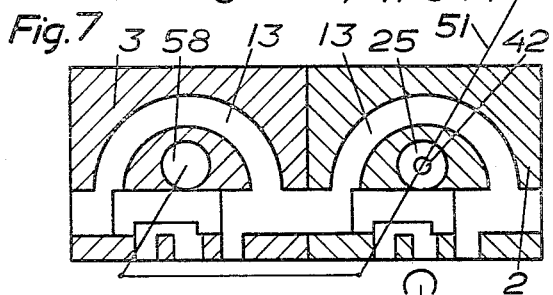
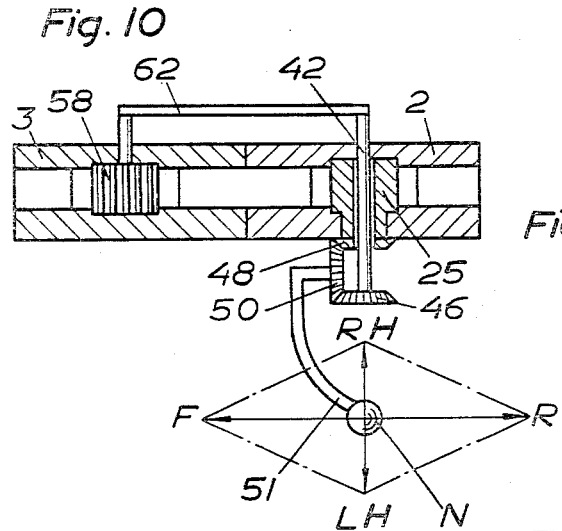
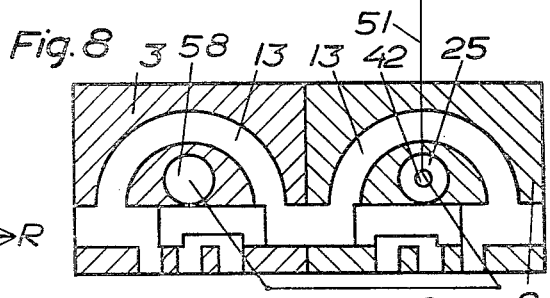
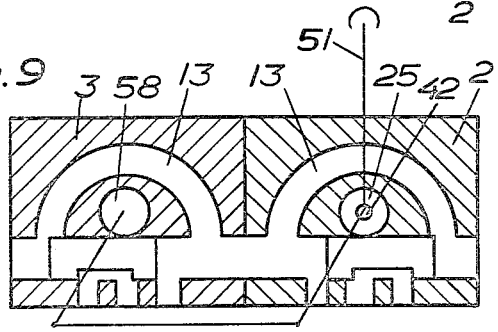
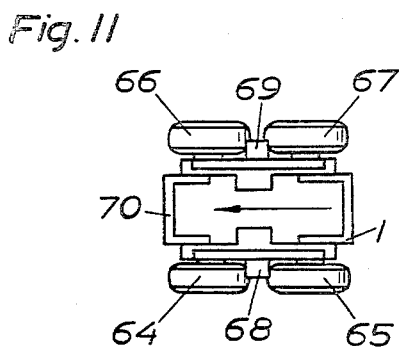
INVENTOR.
SVEN-ERIK NORE ERIKSSON
BY
ERIC Y. MUNSON,
Attorney

United States Patent Office

3,406,718
Patented Oct. 22, 1968

3,406,718
CONTROL VALVE ASSEMBLY FOR FLUID SYSTEMS
Sven-Erik Nore Eriksson, Adolfsberg, Sweden, assignor to Atlas Copco Aktiebolag, Nacka, Sweden, a corporation of Sweden
Filed Apr. 5, 1965, Ser. No. 445,559
2 Claims. (Cl. 137—596)

ABSTRACT OF THE DISCLOSURE

A control valve arrangement particularly adapted for two pressure fluid operated motors, and particularly useful for vehicles having four wheel drive by means of two pressure-operated motors, one of which drives the wheels at one side of the vehicle and the other drives the wheels at the opposite side and in which steering is obtained by driving the wheels of the two sides at different speeds. The valve arrangement includes a first housing coupled to a second or slave housing, the first housing having a first pressure fluid delivery passage, a distributing valve member in the first valve housing and which is movable selectively from a neutral position to establish required communication between supply and delivery passages in the first housing to secure required driving effects, and coupling is arranged between an operating member in the first housing and distributing valve members in the slave housing to effect required movements of the distributing members in both housings to secure desired driving effects.

---

This invention relates to control valve devices for pressure fluid operated mechanisms such as vehicles driven by two pressure fluid operated motors, or the like. The invention may also be used in connection with other pressure fluid operated mechanisms in which the distribution of pressure fluid to more than two pressure fluid conduits or passages or motors is desired to be operated by a single member. One object of the invention is to provide a control valve device for a vehicle with four-wheel drive by means of two pressure fluid operated motors one of which drives the wheels at one side of the vehicle and the other the wheels at the other side and in which steering is obtained by driving the wheels of the two sides with different speeds. Another object of the invention is to provide a control device which consists of a number of simple components. A further object of the invention is to provide a control valve device which comprises components which can be used for different purposes with very little change. For the above and other purposes I provide a control valve device for pressure fluid operated mechanisms comprising a first valve housing, a pressure fluid supply passage in said first valve housing, a first pressure fluid delivery passage in the first valve housing, a second pressure fluid delivery passage in the first valve housing, a distributing valve member in the first valve housing movable selectively from a neutral position in which communication between said supply passage and said first and second delivery passage is interrupted to a first position in which the supply passage communicates with the first delivery passage and to a second position in which the supply passage communicates with the second delivery passage, a slave valve housing having the equivalent passages and distributing valve member as said first valve housing, and an operating member mounted on said first valve housing and operatively coupled to said distributing valve members in the first valve housing and in said slave valve housing for moving said distributing valve members simultaneously towards said first position, simultaneously towards said second position, or one of said distributing valve members towards said first position and the other of said distributing valve members towards said second position, respectively.

In the accompanying drawings one embodiment of a control valve device according to the invention is illustrated by way of example, said control valve device being adapted for controlling the pressure fluid supply such as the compressed air supply to two compressed air driven motors each motor being arranged for driving two wheels at one side of a vehicle with four wheel drive. Such a vehicle may, for instance, be a vehicle of the type described in the assignee's copending application referring to "Improvements in Vehicle Substructures, Components Therefor and Vehicles Provided Therewith," filed by David Gustavsson and Sven-Erik Nore Eriksson concurrently herewith.

In the drawings FIG. 1 is a side view of a portion of a control panel with a first valve housing and a slave valve housing according to the invention, the latter housing being partly broken away. FIG. 2 is a vertical section on lines II—II in FIG. 1 and FIG. 3 is a horizontal section on lines III—III in FIG. 1. FIG. 4 is a vertical section on lines IV—IV in FIG. 1. FIGS 5–9 are diagrammatical longitudinal sections of the first valve housing and the slave valve housing with the valve members in various positions which they may take during operation. FIG. 10 is a diagrammatical plan view of the valve housings in FIGS. 5–9 and an operating handle illustrating the various positions which the operating handle may take as shown in FIGS. 5–9. FIG. 11 is a diagrammatic plan view of a vehicle with four wheel drive which may be provided with a control valve device according to the invention.

The control valve device illustrated in the drawings consists of a control panel 1 which carries a first valve housing 2 and a slave valve housing 3. The valve housings 2 and 3 are of the same general design and are interchangeable. The valve housings 2 and 3 contain tubular valve sleeves 4 which are secured in the valve housings 2 and 3 and provided with two sets of ports 5 and 6 communicating with delivery passages 7 and 8, respectively, at the lower side of the valve housings. The slave valve housing 3 has an inlet passage 9 at one end provided in a fitting 10 for a supply tube 11 for compressed air. The tube 11 communicates through passage 9 with one end of a passage 13 in the slave valve housing 3. The other end of said passage 13 communicates through a passage 12 in a threaded tube 20 with the passage 13 in the first valve housing 2. A distributing valve member 14 is movable in the sleeve 4 of each valve housing 2, 3. The distributing valve members 14 have two piston shaped heads 15 and 16 which in neutral position of the distributing valve member interrupt communication between the passages 13 and the delivery passages 7, 8 as obvious from FIG. 1. The valve housings 2, 3 are provided with outlet passages 17 which communicate with the atmosphere through a filtering mass 18 which may consist of metal wool or other suitable filtering and sound dampening material. The outlet 17 communicates through a port 19 in the valve sleeve 4 with the space btween the valve heads 15 and 16. In neutral position of the valve member 14 the outlet 17 also communicates with the delivery passages 7 and 8 through the ports 5 and 6, respectively.

The first valve housing 2 communicates with the supply pipe 11 through the slave valve housing 3 since the passage 13 of the first valve housing 2 communicates through the passage 12 in the tube 20 with the passage 13 in the slave valve housing and the passage 9 on the fitting 10. The right end of the passage 13 in the first valve housing is closed by a plug 21. The first valve housing 2 is secured to the control panel 1 by means of three bolts 22 and the slave valve housing 3 is secured to the control panel 1 in similar manner by three bolts 22.

The distributing valve member 14 has an intermediate portion which forms a toothed rack 23 and in the first valve housing said rack 23 has teeth which mesh with teeth 24 provided on a rotatable hollow shaft 25. The shaft 25 is journalled in the first valve housing 2 between a stop ring 26 and a shoulder 27 and has a reduced portion 71 which is journalled in a bushing 28. A disc 29 is secured on the shaft portion 71 by means of a key 30. A coil spring 31, partly broken away in FIG. 2, is loosely wound around the bushing 28 and an inner hub portion 32 of the disc 29 and said coil spring has two radially projecting free ends 33 and 34. A pin 35 is secured in the valve housing 2 in the bottom of an annular recess 36 and a pin 37 is secured in the disc 29 in the bottom of an annular recess 38. The pins 35 and 37 engage both end portions 33 and 34 of the spring 31 in such a manner that if the disc 29 is turned anti-clockwise the pin 37 engages the spring end 33 whereas the spring end 34 rests against the pin 35. The spring then tends to return the disc 29 to the neutral position illustrated in FIG. 2. If, on the other hand, the disc 29 is turned clockwise the pin 37 engages the spring end 34 and the spring end 33 engages the pin 35 and consequently the spring end 34 tends to return the pin 37 to the neutral position in this case. A swingable pawl or locking lever 39 is journalled on a split spring pin 72 on top of the housing 2 and is illustrated in inoperative position in FIG. 2. The pawl is kept in this position by a leaf spring 40 during normal operation of the valve device. When the operator leaves a machine provided with a control valve device according to the invention he may move or swing the pawl 39 into engagement with a projection 41 on the disc 29 thereby preventing undesired operation or movement of the disc 29.

A second shaft 42 is rotatably mounted in the shaft 25 and a differential housing 43 is rotatably mounted on the portion 71 of the first shaft 25 and on the second shaft 42 by means of bushings 44 and 45. The differential housing 43 contains a differential gear 46 which is secured on the shaft 42 by means of a transverse pin 47. The differential housing contains a second differential gear 40 which is keyed to the shaft portion 71 by a key 49 and a stop ring 73. A sun gear 50, FIG. 3, is rotatably mounted in the differential housing in mesh with the differential gears 46 and 48. An operating lever 51 is swingable together with the sun gear 50 and on a trunnion 52. The trunnion 53 is connected to the sun gear 50 by means of a key 54 so that the sun gear 50 follows the movements of the operating lever 51 which has forked portions 55, 56. 55 is fixed by a pin on the trunnion 53 and 56 is rotatable on trunnion 52, as obvious from FIG. 3. The trunnion 53 which carries the sun gear 50 is journalled in a bushing 74 in the differential housing 43.

It would be obvious that swinging of the lever 51 towards and away from the plane of the drawing causes the sun gear 50 to rotate in the differential housing and to rotate the differential gears 46 and 48 and the appertaining shafts in opposite directions. On the other hand swinging of the lever 51 in the plane of the drawing as indicated by the arrows in FIG. 1 rotates the differential housing 43 around the axis of the shafts 25, 42 which are consequently rotated in the same sense. On the inner end of the shaft 42 a crank arm 57 is secured which by a link 62 is connected to an equivalent crank arm 57 on the rear side of the slave valve housing 3. The slave valve housing 3 is of the same general design as the first valve housing 2 and contains a distributing valve sleeve 4, a distributing valve member 14, and a shaft 58 which similarly to the shaft 25 provides a toothed gear 59 in mesh with the toothed rack 23 of the distributing valve member 14 in the slave valve housing. The shaft 58 carries a disc 60 which is substantially similar to the disc 29 and is secured to the shaft 58 by a key 61 and a nut 75. A pin 37 is secured in the disc 60 and a pin 35 in the slave valve housing 3 and a coil spring 31 is wound around the bushing 28 and the hub portion 32 of the disc 60 and has radially projecting end portions 33 and 34 engaging the pins 35, 37 in the same way as in the first valve housing 2. A locking pawl 39 is also mounted on the slave valve housing 3 for locking the disc 60 against undesirable motion and in locking position engages a projection 41 on the disc 60 in similar manner as described in connection with the first valve housing 2. The crank arms 57 of the shafts 42, 58 are connected by means of the link 62. The crank arms 57 are secured on their respective shafts by means of cross pins 63. Abutments 76 on the valve housings limit the swinging motion of the discs 29 and 60, respectively, by engagement with the projections 41.

In the diagrammatic FIGS. 5–10 the operation of the control valve device according to the invention is clearly illustrated. The reference numerals in FIGS. 5–11 correspond to reference numerals in FIGS. 1–4 and indicate equivalent parts. FIG. 11 shows a vehicle 70 with four wheels driven by one compressed air motor 68, 69 on each side. It is assumed that motor 68 drives the wheels 64, 65 and motor 69 the wheels 66, 67 through suitable gears. The wheels 64–67 are rotatable on shafts in fixed position relative to the body 70. It may be assumed that the first valve housing 2 is connected to the left side motor 68 or the vehicle 70 with the passage 7 for forward operation and the passage 8 for rearward operation. The slave valve housing 3 may be connected to the right hand motor 69 of the vehicle and similarly with the passage 7 for forward operation and the passage 8 for rearward operation. The passages 17 are then connected for the return fluid from the pressure fluid motors. The teeth on the gears 25, 58 and on the racks of the valve members 14 are not shown in FIGS. 5–9 since they would only complicate the drawing. When the operating handle 51 is in the position N, FIG. 10, i.e. in neutral position, then the distributing valves 14 are in the position illustrated in FIG. 5 or FIG. 1 and no pressure fluid can flow from passages 13 to 7 or 8, respectively. However, fluid can flow from the passages 7, 8 to the passage 17 which may be necessary, for instance, when the vehicle is towed by another vehicle. When it is desired to drive the vehicle forward at full speed the operating lever 51 is moved to the position F which moves the distributing valves 14 in the first valve housing 2 and in the slave valve housing 3 to the positions illustrated in FIG. 6. Full pressure fluid supply is then provided to both motors 68, 69 through the passages 7 of both housings 2 and 3. Simultaneously the passages 8 are connected with the outlet 17 in both housings. Now, if it is desired to move the vehicle rearwards, the operating lever 51 is moved to the position R in FIG. 10 and the distributing valves 14 then take the position illustrated in FIG. 7 so that both motors 68, 69 move the vehicle 70 rearwards. Since the vehicle is of the type which cannot be steered by swinging of the wheel axis on vertical pivots, steering is possible only by changing or reversing the speed of the wheels at one side relative to the speed of the wheels at the opposite side. Looking in the direction of the arrow in FIG. 11 as being the forward direction then a movement of the lever 51 to the LH position in FIG. 10 causes the distributing valves 14 to be moved as illustrated in FIG. 8 which has the result that the motor 68 is operated rearwards and the motor 69 is operated forwards so that the vehicle makes a left hand turn on the spot. On the contrary movement of the lever 51 to the position RH in FIG. 10 moves the distributing valve 14 member as indicated in FIG. 9 in such a manner that the vehicle makes a right hand turn. It is also obvious that the operating lever 51 may take any intermediate position within the rhombus F–RH–R–LH–F so that the motors 68, 69 may be driven with different speeds forward or reverse or one motor forward and the other reverse, causing the vehicle to make more or less sharp turns as may be desired.

The control valve device above described should only be considered as an example and may be modified in several different ways within the scope of the claims. For instance, the valve device may be used for operation of hydraulic motors instead of pneumatic motors and it may also be used for operating other mechanisms than vehicle motors such as pneumatic or hydraulic cylinders, or the like. It should be observed, that all details in the slave valve housing 3 except the shaft 58 and disc 60 are the same as in the first valve housing 2.

What I claim is:

1. A control valve assembly for pressure fluid systems comprising, a first valve housing having a first end and a second end, a pressure fluid supply passage extending from said first end to said second end, a first pressure fluid delivery passage in the first valve housing, a second pressure fluid delivery passage in the first valve housing, a distributing valve member in said first valve housing having a toothed rack portion disposed between two piston valve portions movable selectively from a neutral position in which communication between said supply passage and said first and second delivery passage is interrupted to a first position in which the supply passage communicates with the first delivery passage and to a second position in which the supply passage communicates with the second delivery passage; an operating means including a bushing rotatably mounted in the housing and provided with a toothed gear portion in mesh with said toothed rack portion for moving the piston valve member to said first and second position, an operating shaft mounted for rotation in the housing and extending co-axially through said bushing, said bushing and said shaft projecting from said housing, a differential housing mounted for swinging on said projecting shaft of said first valve housing, first and second rotatable differential gears in said differential housing positioned about said projecting shaft, said first gear being fixed on the bushing and the second gear being fixed on the shaft, a sun gear in the differential housing meshing with said first and second differential gears and mounted for rotation in the differential housing to rotate said first and second differential gears, an operating lever mounted for swinging on the differential housing and fixed to said sun gear for rotating the sun gear in either direction from a neutral position and operable to swing the differential housing for simultaneously rotating the first and second differential gears in either direction from a neutral position; a slave valve housing having the equivalent of the passages and the distributing valve member with its toothed rack, a slave valve shaft having a toothed gear portion in mesh with the toothed rack of the slave valve member and rotatably mounted in the slave valve housing, means coupling said operating shaft in the first valve housing to the slave valve shaft to transmit rotation of said operating shaft to rotation of said slave valve shaft, and spring means acting on at least one of said bushing and said drive shaft and through said gears to bias said operating lever back to a centered, neutral position from any direction of movement.

2. A control valve device as set forth in claim 1, further including latching means between at least one of said valve housings and its corresponding operating means.

References Cited

UNITED STATES PATENTS

| | | | |
|---|---|---|---|
| 476,228 | 5/1892 | Hamilton | 137—625.69 |
| 2,033,941 | 3/1936 | Kryzanowski | 137—637.1 |
| 2,431,290 | 11/1947 | Wildermann | 137—636 X |
| 2,481,293 | 9/1949 | Cooney | 137—625.69 |
| 3,095,903 | 7/1963 | Jennings | 137—625.68 |
| 2,203,939 | 6/1940 | Barrett | 137—596 |
| 2,393,324 | 1/1946 | Joy | 180—6.48 |
| 2,792,021 | 5/1957 | Greeley | 137—596 |
| 3,233,691 | 2/1966 | DeBiasi | 180—6.48 |

HENRY T. KLINKSIEK, *Primary Examiner.*